US009268619B2

(12) United States Patent
Rivkin

(10) Patent No.: US 9,268,619 B2
(45) Date of Patent: Feb. 23, 2016

(54) SYSTEM FOR COMMUNICATING BETWEEN A PLURALITY OF REMOTE ANALYTICAL INSTRUMENTS

(75) Inventor: Slava Rivkin, Ashkelon (IL)

(73) Assignee: Abbott Informatics Corporation, Hollywood, FL (US)

( * ) Notice: Subject to any disclaimer, the term of this patent is extended or adjusted under 35 U.S.C. 154(b) by 111 days.

(21) Appl. No.: 13/310,200

(22) Filed: Dec. 2, 2011

(65) Prior Publication Data

US 2013/0145046 A1 Jun. 6, 2013

(51) Int. Cl.
*G06F 15/16* (2006.01)
*G06F 9/54* (2006.01)

(52) U.S. Cl.
CPC ...................... *G06F 9/541* (2013.01)

(58) Field of Classification Search
USPC .......................................................... 709/246
See application file for complete search history.

(56) References Cited

U.S. PATENT DOCUMENTS

| | | | |
|---|---|---|---|
| 4,812,996 A | 3/1989 | Stubbs | |
| 4,831,580 A | 5/1989 | Yamada | |
| 4,985,857 A | 1/1991 | Bajpai et al. | |
| 5,104,621 A | 4/1992 | Pfost et al. | |
| 5,532,941 A | 7/1996 | Lin | |
| 5,614,415 A | 3/1997 | Markin | |
| 5,664,093 A | 9/1997 | Barnett et al. | |
| 5,697,788 A | 12/1997 | Ohta | |
| 5,812,394 A | 9/1998 | Lewis et al. | |
| 5,920,718 A | 7/1999 | Uczekaj et al. | |
| 5,946,471 A | 8/1999 | Voorhees et al. | |
| 5,985,670 A | 11/1999 | Markin | |
| 6,055,487 A | 4/2000 | Margery et al. | |
| 6,064,812 A | 5/2000 | Parthasarathy et al. | |
| 6,094,684 A | 7/2000 | Pallmann | |
| 6,102,965 A | 8/2000 | Dye et al. | |
| 6,173,438 B1 | 1/2001 | Kodosky et al. | |
| 6,192,320 B1 | 2/2001 | Margrey et al. | |
| 6,219,628 B1 | 4/2001 | Kodosky et al. | |
| 6,298,474 B1 | 10/2001 | Blowers et al. | |

(Continued)

OTHER PUBLICATIONS

European Patent Office (International Searching Authority), International Search Report and Written Opinion for PCT/US2011/067706 (Filing Date Dec. 29, 2011) Date of Mailing Apr. 4, 2012.

(Continued)

*Primary Examiner* — Wing F Chan
*Assistant Examiner* — Padma Mundur
(74) *Attorney, Agent, or Firm* — Klintworth & Rozenblat IP LLC

(57) ABSTRACT

A method for allowing communication between a remote analytical instrument and a client component is provided. The method includes communicating a first software message in a first message format from a client component to a first connectivity driver, translating the first software message from the first message format to the second message format using the first connectivity driver, and communicating the software messages in the second message format directly to the first remote analytical instrument from the first connectivity driver. The first software message relates to the operation of a first remote analytical instrument. The first software message is selected from a standardized command set. The first remote analytical instrument is configured to receive messages in a second message format different than the first message format which are capable of inducing operation of the first remote analytical instrument.

21 Claims, 8 Drawing Sheets

(56) References Cited

U.S. PATENT DOCUMENTS

| | | | |
|---|---|---|---|
| 6,326,147 B1 | 12/2001 | Oldham et al. |
| 6,370,569 B1 | 4/2002 | Austin |
| 6,526,566 B1 | 2/2003 | Austin |
| 6,581,012 B1 | 6/2003 | Aryev et al. |
| 6,643,691 B2 | 11/2003 | Austin |
| 6,681,198 B2 | 1/2004 | Buote et al. |
| 6,751,653 B2 | 6/2004 | Austin |
| 6,879,926 B2 | 4/2005 | Schmit et al. |
| 6,909,974 B2 | 6/2005 | Yung et al. |
| 6,938,026 B2 | 8/2005 | Yundt-Pacheco |
| 7,000,191 B2 | 2/2006 | Schmitt et al. |
| 7,162,387 B2 | 1/2007 | Johnson et al. |
| 7,197,418 B2 | 3/2007 | Fuller, III et al. |
| 7,197,743 B2 | 3/2007 | Borg et al. |
| 7,200,838 B2 | 4/2007 | Kodosky et al. |
| 7,275,070 B2 | 9/2007 | Kataria et al. |
| 7,275,235 B2 | 9/2007 | Molinari et al. |
| 7,333,962 B2 | 2/2008 | Zen |
| 7,379,821 B2 | 5/2008 | Yung et al. |
| 7,379,823 B2 | 5/2008 | Yung et al. |
| 7,467,153 B2 | 12/2008 | Boyce et al. |
| 7,491,367 B2 | 2/2009 | Yung et al. |
| 7,499,824 B2 | 3/2009 | Johnson et al. |
| 7,506,304 B2 | 3/2009 | Morrow et al. |
| 7,512,931 B2 | 3/2009 | Schmit |
| 7,536,269 B2 | 5/2009 | Sierer et al. |
| 7,565,351 B1 | 7/2009 | Callaghan |
| 7,574,690 B2 | 8/2009 | Shah et al. |
| 7,581,191 B2 | 8/2009 | Rice et al. |
| 7,593,787 B2 | 9/2009 | Feingold et al. |
| 7,593,944 B2 | 9/2009 | Rogers et al. |
| 7,594,220 B2 | 9/2009 | Kodosky et al. |
| 7,594,226 B2 | 9/2009 | Stelzer et al. |
| 7,603,478 B2 | 10/2009 | Thurman et al. |
| 7,603,652 B2 | 10/2009 | Makowski et al. |
| 7,606,950 B2 | 10/2009 | Breyer |
| 7,607,070 B2 | 10/2009 | Clark et al. |
| 7,613,954 B2 | 11/2009 | Grey et al. |
| 7,620,459 B2 | 11/2009 | Renner |
| 7,620,897 B2 | 11/2009 | Shah et al. |
| 7,624,294 B2 | 11/2009 | Conway |
| 7,624,375 B2 | 11/2009 | Santori et al. |
| 7,626,474 B2 | 12/2009 | Mullen et al. |
| 7,627,695 B2 | 12/2009 | Peck et al. |
| 7,627,860 B2 | 12/2009 | Kodosky et al. |
| 7,630,560 B2 | 12/2009 | Wenzel |
| 7,630,854 B2 | 12/2009 | Sierer et al. |
| 7,631,097 B2 | 12/2009 | Moch et al. |
| 7,631,295 B2 | 12/2009 | Makowski et al. |
| 7,644,207 B2 | 1/2010 | Castro et al. |
| 7,647,562 B2 | 1/2010 | Ghercioiu et al. |
| 7,647,578 B2 | 1/2010 | Murphy et al. |
| 7,647,600 B2 | 1/2010 | Muller et al. |
| 7,649,726 B2 | 1/2010 | Castro |
| 7,650,264 B2 | 1/2010 | Kodosky et al. |
| 7,650,316 B2 | 1/2010 | Peck et al. |
| 7,650,574 B2 | 1/2010 | Nattinger |
| 7,650,589 B2 | 1/2010 | Cifra |
| 7,650,594 B2 | 1/2010 | Nattinger |
| 7,667,582 B1 | 2/2010 | Waldorf |
| 7,668,376 B2 | 2/2010 | Lin et al. |
| 7,669,185 B2 | 2/2010 | Vrancic et al. |
| 7,680,605 B2 | 3/2010 | Yung et al. |
| 7,684,878 B2 | 3/2010 | Reindel et al. |
| 7,689,727 B2 | 3/2010 | Chandhoke |
| 7,689,917 B2 | 3/2010 | Washington et al. |
| RE41,228 E | 4/2010 | Kodosky et al. |
| 7,694,273 B2 | 4/2010 | Kodosky et al. |
| 7,701,869 B2 | 4/2010 | Hogan |
| 7,702,416 B2 | 4/2010 | Ravish et al. |
| 7,702,417 B2 | 4/2010 | Ravish et al. |
| 7,703,027 B2 | 4/2010 | Hsu et al. |
| 7,703,032 B2 | 4/2010 | Wells |
| 7,703,034 B2 | 4/2010 | Kornerup et al. |
| 7,707,014 B2 | 4/2010 | Kodosky et al. |
| 7,725,356 B2 | 5/2010 | Shah et al. |
| 7,725,627 B2 | 5/2010 | Crain, II et al. |
| 7,725,874 B2 | 5/2010 | Kornerup et al. |
| 7,725,877 B2 | 5/2010 | Andrade et al. |
| 7,730,450 B2 | 6/2010 | Mercer |
| 7,743,335 B2 | 6/2010 | Rogers et al. |
| 7,743,362 B2 | 6/2010 | Peck et al. |
| 7,760,238 B2 | 7/2010 | Giesen |
| 7,761,802 B2 | 7/2010 | Shah et al. |
| 7,761,846 B2 | 7/2010 | Hayles |
| 7,761,847 B2 | 7/2010 | Kornerup et al. |
| 7,761,859 B2 | 7/2010 | Low |
| 7,764,619 B2 | 7/2010 | Mathena et al. |
| 7,765,278 B2 | 7/2010 | Dove et al. |
| 7,765,493 B2 | 7/2010 | Chickles et al. |
| 7,769,597 B2 | 8/2010 | Fry et al. |
| 7,778,717 B2 | 8/2010 | Bachman et al. |
| 7,791,671 B2 | 9/2010 | Schultz et al. |
| 7,793,273 B2 | 9/2010 | Mercer et al. |
| 7,801,258 B2 | 9/2010 | Narus et al. |
| 7,802,229 B2 | 9/2010 | Kornerup et al. |
| 8,234,637 B2 * | 7/2012 | Ghosh-Roy et al. ........ 717/155 |
| 2002/0068984 A1 * | 6/2002 | Alexander et al. .......... 700/17 |
| 2002/0109722 A1 | 8/2002 | Rogers et al. |
| 2002/0111783 A1 | 8/2002 | Kodosky et al. |
| 2002/0174264 A1 | 11/2002 | Fuller et al. |
| 2002/0184326 A1 | 12/2002 | Thomson |
| 2002/0196282 A1 | 12/2002 | Washington et al. |
| 2003/0005179 A1 | 1/2003 | Schmit et al. |
| 2003/0035008 A1 | 2/2003 | Fuller et al. |
| 2003/0036866 A1 | 2/2003 | Nair et al. |
| 2003/0144997 A1 | 7/2003 | Hugley |
| 2003/0145252 A1 | 7/2003 | Grey et al. |
| 2003/0145280 A1 | 7/2003 | Grey et al. |
| 2003/0165259 A1 | 9/2003 | Balent et al. |
| 2003/0172127 A1 | 9/2003 | Northrup et al. |
| 2003/0177042 A1 | 9/2003 | Leon |
| 2003/0177471 A1 | 9/2003 | Chiu et al. |
| 2003/0228583 A1 | 12/2003 | Amacher et al. |
| 2003/0231216 A1 | 12/2003 | McBrearty et al. |
| 2004/0017392 A1 | 1/2004 | Welch |
| 2004/0031019 A1 | 2/2004 | Lamanna et al. |
| 2004/0032412 A1 | 2/2004 | Odom |
| 2004/0032430 A1 | 2/2004 | Yung et al. |
| 2004/0034478 A1 | 2/2004 | Yung et al. |
| 2004/0039531 A1 * | 2/2004 | Yung et al. ............. 702/19 |
| 2004/0042471 A1 | 3/2004 | Yung et al. |
| 2004/0090439 A1 | 5/2004 | Dillner |
| 2004/0093180 A1 | 5/2004 | Grey et al. |
| 2004/0122708 A1 | 6/2004 | Avinash et al. |
| 2004/0150667 A1 | 8/2004 | Dove et al. |
| 2004/0193572 A1 | 9/2004 | Leary |
| 2004/0205111 A1 | 10/2004 | Chasmawala et al. |
| 2004/0230945 A1 | 11/2004 | Bryant et al. |
| 2005/0022103 A1 | 1/2005 | Yundt-Pacheco |
| 2005/0028107 A1 | 2/2005 | Gomes et al. |
| 2005/0028138 A1 | 2/2005 | Case et al. |
| 2005/0038676 A1 | 2/2005 | Showalter et al. |
| 2005/0049814 A1 | 3/2005 | Ramchandani |
| 2005/0070019 A1 | 3/2005 | Yamamoto |
| 2005/0076002 A1 | 4/2005 | Williams et al. |
| 2005/0106736 A1 | 5/2005 | Yung et al. |
| 2005/0149566 A1 | 7/2005 | Baek et al. |
| 2005/0155014 A1 | 7/2005 | Andrade et al. |
| 2005/0155015 A1 | 7/2005 | Novacek |
| 2005/0177816 A1 | 8/2005 | Kudukoli et al. |
| 2005/0195194 A1 | 9/2005 | Cummings |
| 2005/0228608 A1 | 10/2005 | Wells |
| 2005/0257195 A1 | 11/2005 | Morrow et al. |
| 2005/0268173 A1 | 12/2005 | Kudukoli et al. |
| 2005/0273272 A1 | 12/2005 | Brando et al. |
| 2006/0008151 A1 | 1/2006 | Lin et al. |
| 2006/0036656 A1 | 2/2006 | Mercer |
| 2006/0036799 A1 | 2/2006 | Shah et al. |
| 2006/0036997 A1 | 2/2006 | Low |
| 2006/0041860 A1 | 2/2006 | Carmichael et al. |
| 2006/0088940 A1 | 4/2006 | Feingold et al. |
| 2006/0117302 A1 | 6/2006 | Mercer et al. |
| 2006/0156294 A1 | 7/2006 | Fuller, III et al. |

(56) References Cited

U.S. PATENT DOCUMENTS

| | | |
|---|---|---|
| 2006/0168183 A1 | 7/2006 | Fuller, III et al. |
| 2006/0168515 A1 | 7/2006 | Dorsett, Jr. et al. |
| 2006/0190105 A1 | 8/2006 | Hsu et al. |
| 2006/0225034 A1 | 10/2006 | Peck et al. |
| 2006/0235548 A1 | 10/2006 | Gaudette |
| 2006/0291399 A1 | 12/2006 | Mathena et al. |
| 2007/0010911 A1 | 1/2007 | Feingold et al. |
| 2007/0038592 A1 | 2/2007 | Haub et al. |
| 2007/0044030 A1 | 2/2007 | Hayles |
| 2007/0044072 A1 | 2/2007 | Hayles |
| 2007/0044073 A1 | 2/2007 | Kornerup et al. |
| 2007/0044078 A1 | 2/2007 | Cifra |
| 2007/0088865 A1 | 4/2007 | Breyer |
| 2007/0089063 A1 | 4/2007 | Breyer |
| 2007/0129818 A1 | 6/2007 | Andrade et al. |
| 2007/0129894 A1 | 6/2007 | Yung et al. |
| 2007/0141711 A1 | 6/2007 | Stephens et al. |
| 2007/0168943 A1 | 7/2007 | Marini et al. |
| 2007/0179644 A1 | 8/2007 | Ravish et al. |
| 2007/0185828 A1 | 8/2007 | Brown |
| 2007/0192136 A1* | 8/2007 | Lipscher et al. ............... 705/2 |
| 2007/0198445 A1 | 8/2007 | Zen |
| 2007/0198923 A1 | 8/2007 | Kodosky et al. |
| 2007/0214427 A1 | 9/2007 | Peck et al. |
| 2007/0233655 A1 | 10/2007 | Engels |
| 2007/0234195 A1 | 10/2007 | Wells |
| 2007/0244990 A1 | 10/2007 | Wells |
| 2007/0297443 A1 | 12/2007 | Bowers et al. |
| 2008/0022264 A1 | 1/2008 | Macklem et al. |
| 2008/0022270 A1 | 1/2008 | Morrow et al. |
| 2008/0034298 A1 | 2/2008 | Kodosky et al. |
| 2008/0034300 A1 | 2/2008 | Shah et al. |
| 2008/0034345 A1 | 2/2008 | Curtis et al. |
| 2008/0043826 A1 | 2/2008 | Castro et al. |
| 2008/0046414 A1 | 2/2008 | Haub et al. |
| 2008/0052665 A1 | 2/2008 | Bray |
| 2008/0059944 A1 | 3/2008 | Patterson et al. |
| 2008/0240321 A1 | 10/2008 | Narus et al. |
| 2008/0256511 A1 | 10/2008 | Lay et al. |
| 2008/0263343 A1 | 10/2008 | Kassas et al. |
| 2008/0263512 A1 | 10/2008 | Dellas et al. |
| 2008/0263521 A1 | 10/2008 | Neumann et al. |
| 2008/0270920 A1 | 10/2008 | Hudson |
| 2008/0300697 A1 | 12/2008 | Moriat et al. |
| 2008/0307332 A1 | 12/2008 | Hayles et al. |
| 2009/0019453 A1 | 1/2009 | Kodaganur et al. |
| 2009/0027509 A1 | 1/2009 | Giesen |
| 2009/0049424 A1 | 2/2009 | Kumar et al. |
| 2009/0089715 A1 | 4/2009 | Dickey |
| 2009/0106755 A1 | 4/2009 | Chandhoke |
| 2009/0106761 A1 | 4/2009 | Chandhoke |
| 2009/0113322 A1 | 4/2009 | Rogers |
| 2009/0113337 A1 | 4/2009 | Rogers |
| 2009/0121908 A1 | 5/2009 | Regier |
| 2009/0130765 A1 | 5/2009 | Bauer et al. |
| 2009/0178025 A1 | 7/2009 | Morrow et al. |
| 2009/0193396 A1 | 7/2009 | Hartadinata |
| 2009/0234471 A1 | 9/2009 | Chandhoke |
| 2009/0235231 A1 | 9/2009 | Kodosky et al. |
| 2009/0241068 A1 | 9/2009 | Page et al. |
| 2009/0241069 A1 | 9/2009 | Fuller, III et al. |
| 2009/0288025 A1 | 11/2009 | King et al. |
| 2009/0288073 A1 | 11/2009 | Gosalia et al. |
| 2009/0292511 A1 | 11/2009 | Vrancic et al. |
| 2009/0293044 A1 | 11/2009 | Boettcher et al. |
| 2009/0297042 A1 | 12/2009 | Nair et al. |
| 2009/0299924 A1 | 12/2009 | Bauer et al. |
| 2009/0319987 A1 | 12/2009 | Bartz |
| 2010/0010646 A1 | 1/2010 | Drew et al. |
| 2010/0023866 A1 | 1/2010 | Peck et al. |
| 2010/0030509 A1 | 2/2010 | Crain, II et al. |
| 2010/0030539 A1 | 2/2010 | Chandhoke et al. |
| 2010/0031231 A1 | 2/2010 | Ilic et al. |
| 2010/0058289 A1 | 3/2010 | Hudson, III et al. |
| 2010/0262453 A1 | 10/2010 | Robinson et al. |
| 2010/0271479 A1 | 10/2010 | Heydlauf |
| 2011/0213700 A1 | 9/2011 | Sant'Anselmo |

OTHER PUBLICATIONS

Starlims Clinical Solutions User Manual for V10; Starlims Database 10.5, Starlims Dictionary 10.5; Starlims.net XFD Framework Version 10.5.0.48, Starlims Corporation Jun. 2010 (pp. 1-490).

United States Patent and Trademark Office (International Searching Authority), International Search Report and Written Opinion for PCT/US12/36281 (Filing date May 3, 2012) Date of Mailing: Jun. 20, 2012.

Starlims Version 10 Configurable Off-the-Shelf LIMS for Laboratory and Enterprise Collaboration (Copyright 2008) available at starlims. com as of Mar. 28, 2010 )(See attached printout of http://web.archive. org/web/20100328051822/http://www.starlims.com/news/ TechnicalNotes.htm).

* cited by examiner

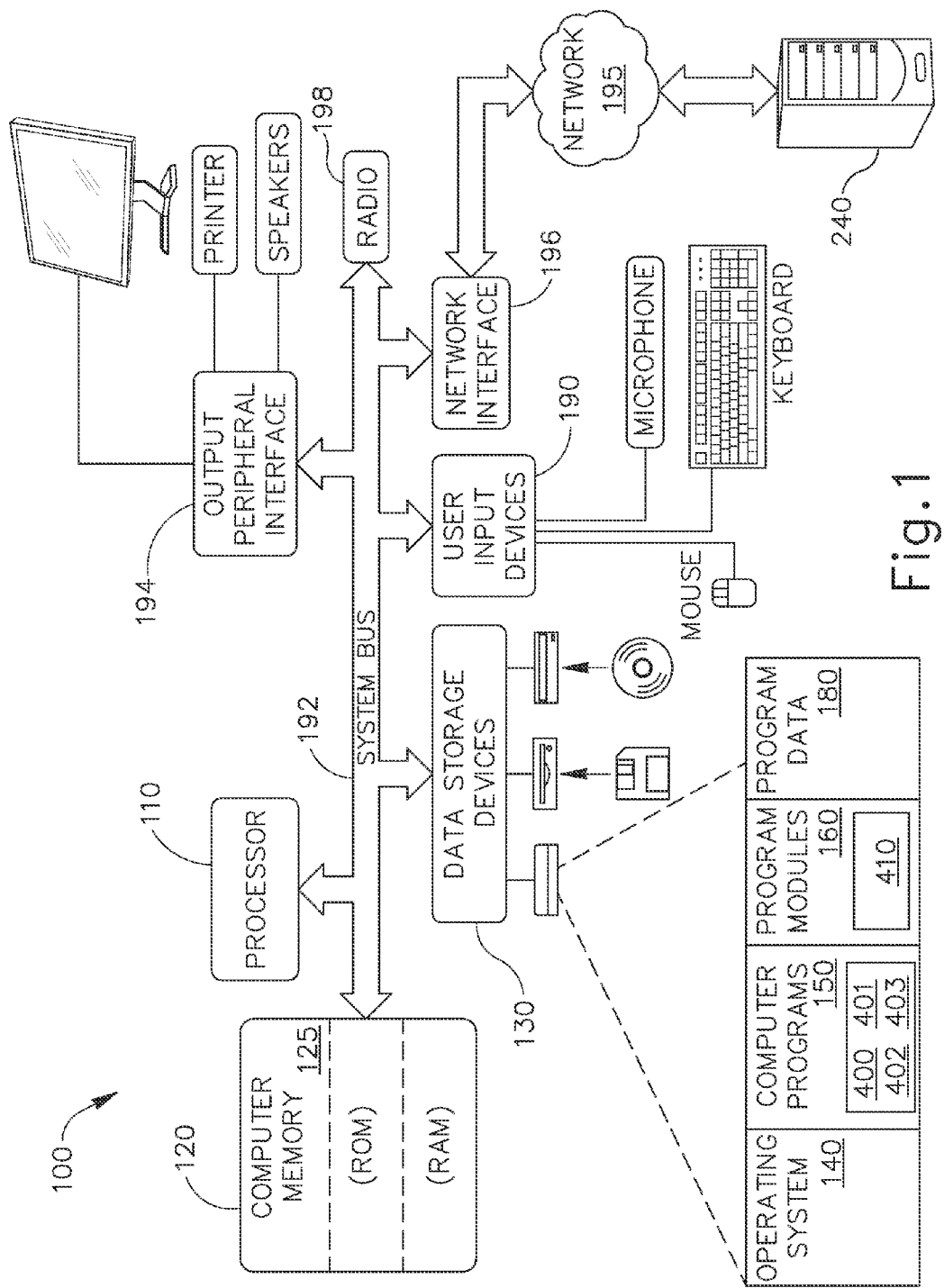

Leeton|||||||||||Decatur|r|h|0|||UNK|UNK^A100^i|^^^1003^Cl^DIL1^P|R||20020719141900|||||||||||F|\r\nR|1|^^^1003^Cl^DIL1^P^^^^|F|9
8.7|UG/L|2 to 1000|||R|Ken Nash||20020923080000|5\r\nR|2|^^^1003^Cl^DIL1^P^^^^|500|||R|Ken
Nash||20020923080000|5\r\nR|3|^^^1003^Cl^DIL1^P^^^^P|50|R|U|||R|Ken Nash||20020923080000|5\r\nL|1"
  </InstrumentDetails>
  <TransmisionDetails>
    <ColLevel1>

<Content message="H position=0 field="header"/>
      <ColLevel2>
        <Content message="^&" position=1 field="init"/>
        <Content message=""^4^800A^H1P1O1R1C1Q1L1" position=4 field="deviceId"/>
        <Content message="P position=11 field=""/>
        <Content message="1" position=12 field=""/>
        <Content message="20090414134122" position13 field="" />
      <ColLevel2>

</ColLevel1>
    <ColLevel1>
      <Content message="p" position=1 field="patientDetails"/>
      <ColLevel2>
        <Content message="1" position=1 field=""/>
        <Content message="1" position=2 field=""/>
        <Content message="2" position=3 field=""/>
        <Content message="6" position=4 field=""/>
        <Content message="P" position=5 field=""/>
        <Content message="Spence^Randy^W." position=6 field="name"/>
        <Content message="1961127" position=8 field=""/>

Fig.2B

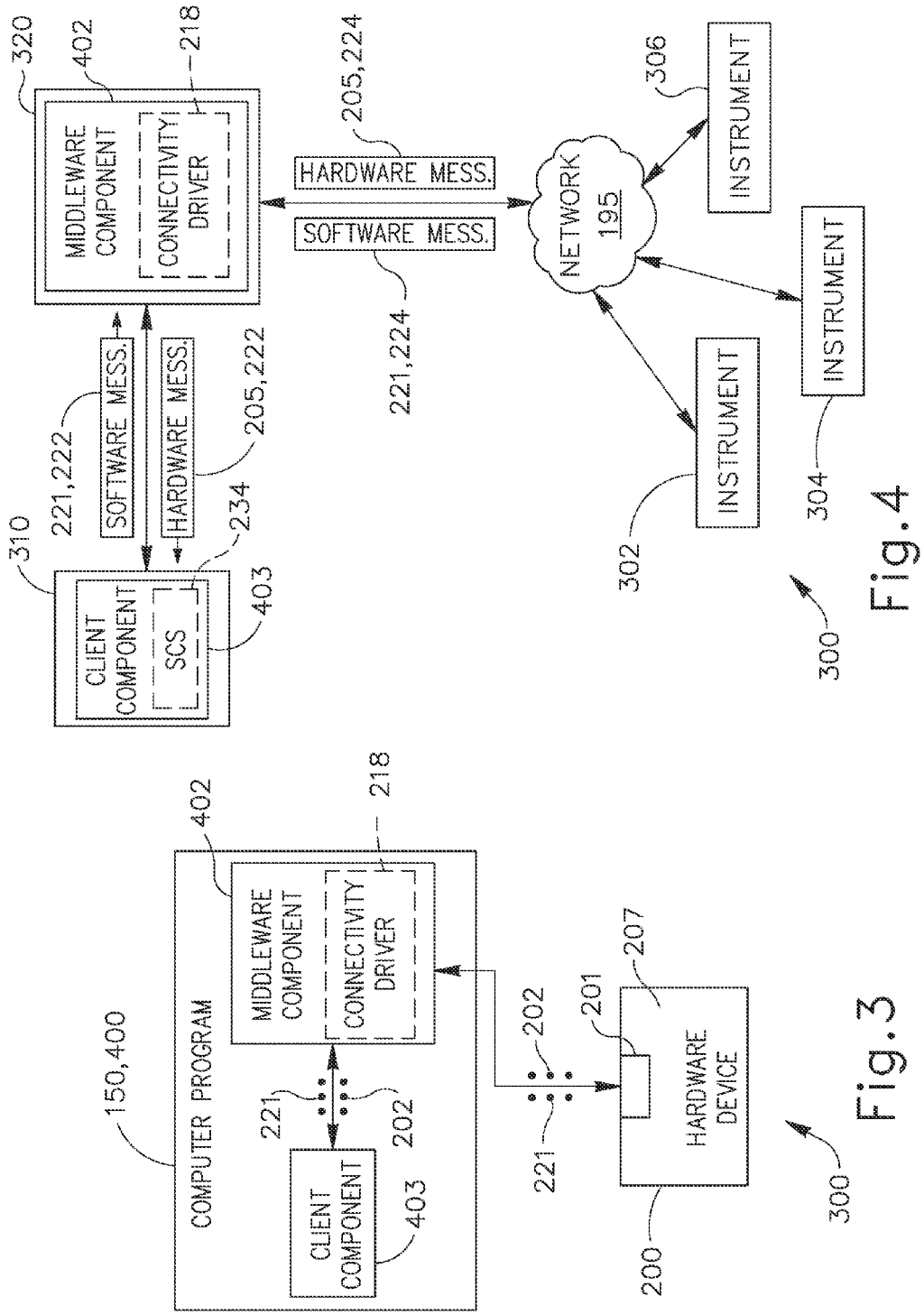

SYSTEM FOR COMMUNICATING BETWEEN A PLURALITY OF REMOTE ANALYTICAL INSTRUMENTS

BACKGROUND

A Laboratory Information Management System or Laboratory Integration Management Solution (LIMS) is a software system used in laboratories for the integration of laboratory software and analytical instruments and the management of samples, laboratory users, standards and other laboratory functions such as Quality Assurance (QA) and Quality Control (QC), sample planning, invoicing, plate management, and workflow automation. LIMS software may also support information gathering, decision making, calculation, review and release into the workplace and away from the office. More recently, LIMS software are starting to expand into Electronic Laboratory Notebooks, assay data management, data mining and data analysis.

One core function of a LIMS is the management of samples. This typically is initiated when a sample is received in the laboratory at which point the sample will be registered in the LIMS. This registration process may involve accessioning the sample and producing barcodes to affix to the sample container. Various other parameters may be recorded as well, such as clinical or phenotypic information corresponding with the sample. The LIMS may then track chain of custody of the sample as well as the sample location. Location tracking often involves assigning the sample to a particular location such as a shelf/rack/box/row/column. Other event tracking may be required such as freeze and thaw cycles that a sample undergoes in the laboratory.

Modern LIMS have implemented extensive configurability as each laboratories needs for tracking additional data points can vary widely. LIMS vendors often cannot make assumptions about what these data tracking needs are and therefore need to be adaptable to each environment. LIMS users may also have regulatory concerns to comply with such as CLIA, HIPAA, GLP and FDA specifications and this can affect certain aspects of sample management in a LIMS solution. One key to compliance with many of these standards is audit logging of all changes to LIMS data, and in some cases a full electronic signature system is required for rigorous tracking of field level changes to LIMS data.

One may configure a LIMS whereby users are assigned roles or groups. Typically the role of a user will dictate their access to specific data records in the LIMS. Each user account is protected by security mechanisms such as a user id and a password. Users may have customized interfaces based on their role in the organization. For example, a laboratory manager might have full access to all of a LIMS functions and data, whereas laboratory technicians might have access only to data and functionality needed for their individual worktasks.

Some LIMS offer some capability for integration with analytical instruments. A LIMS may create control files that are "fed" into the analytical instrument and direct its operation on some physical item such as a sample tube or sample plate. The LIMS may then import instrument results files to extract QC or results data for assessment of the operation on the sample or samples. Data owners may access the resulting stored information at any time. Typically, the LIMS operate using instructions which are generated in a first message format and the analytical instruments operate by receiving commands in a second message format which is different from the first message format. As a result, in order to communicate between the LIMS and the analytical instrument, the instructions routinely need to be converted into commands, and vice versa, using one of a variety of known techniques.

Currently, in one technique, some LIMS communicate with analytical instruments through a series of hardware interface cards which are instrument-specific and therefore vary with respect to the type of analytical instrument they are being installed on or connected with. Each hardware interface card must be installed on or connected with a particular type of analytical instrument. The hardware interface card may translate instrument data into a standardized language which is then communicated with a host computer, providing for a universal interface between the analytical instrument and the host computer. Often, the host computers are then connected with a remote computer upon which the LIMS software resides. Having to design and manufacture a hardware interface card for each analytical instrument for which the LIMS needs to communicate with, can be rather costly.

Alternatively, in another technique, specific software can be written for and loaded onto each analytical instrument to be used as a "dedicated" interface. A dedicated interface is one that is designed to operate with only one type of computer or one type of analytical instrument. Although not as convenient, dedicated interfaces can be used to overcome specific hardware issues which arise with universal interfaces. Nevertheless, a dedicated interface is not as convenient as a universal interface, and may require software to be written for and loaded onto each analytical instrument.

Finally, using a last technique, a client computer generates instructions in a first message format using specific information obtained about the analytical instrument. Those instructions are then communicated with the analytical instrument using the LIMS, which is often centrally located on a remote computer. In some instances, the specific information about the analytical instrument includes its logical location and operational parameters, so that then client computer may generate instructions in a first message format which are then sent to the LIMS and later converted into commands in a second message format different from the first message format, in order to induce operation of the analytical instrument. Without knowledge of this specific information, the client computer is unable to generate the instructions.

It would be desirable to provide a simplified method for allowing a LIMS to communicate between a plurality of remote analytical instruments which does not require the use of a specialized hardware interface cards or specific software to be written for and loaded onto each analytical instrument. It would also be desirable to provide a simplified method for allowing a client computer of a LIMS to communicate between a plurality of remote analytical instruments which does not require the client computer to have access to specific information about the analytical instrument, such as the logical location or operational parameters for the analytical instrument.

SUMMARY

In one aspect, a system for communicating between a remote analytical instrument and a client component of a LIMS software application is provided. The system includes, but is not limited to, a first remote analytical instrument having a first logical location, a client component, and a management component. The client component is configured to communicate a first software message in a first message format relating to the operation of the first remote analytical instrument. The first software message is selected from a standardized command set. The first remote analytical instrument is configured to receive messages in a second message format different than the first file format. Messages in the second message format are recognized by the first remote analytical instrument and are capable of inducing operation of the first remote analytical instrument. The management component is configured to receive the first software message in a first message format from the client component. The management component is configured to communicate the first software message in the first message format with a first connectivity driver. The first connectivity driver is a software component located on a centralized server which is in communication with the client component and the first remote analytical instrument. The first connectivity driver is configured to translate the first software messages from the first message format into the second message format. The first connectivity driver has access to the first logical location of the first remote analytical instrument such that software messages in the second message format can be directly communicated by the first connectivity driver to the first remote analytical instrument.

In one aspect, a computer-readable medium comprising program instructions for allowing communication between a remote analytical instrument and a client component is provided. The computer-readable medium is a non-transitory medium. The program instructions are executable by a processor to communicate a first software message in a first message format from a client component using a first connectivity driver. The first software message relates to the operation of a first remote analytical instrument and is selected from a standardized command set. The first remote analytical instrument is configured to receive and decode messages in a second message format different than the first message format. The messages in the second message format are capable of inducing operation of the first remote analytical instrument. The program instructions are also executable by a processor to receive the first software message from the client component at the first connectivity driver, to translate the first software message from the first message format to the second message format using the first connectivity driver, and to communicate the first software message in the second message format to the first remote analytical instrument. The connectivity driver uses the logical location of the first remote analytical instrument in order to communicate the first software message in the second message format to the first remote analytical instrument.

In one aspect, a method for allowing communication between a remote analytical instrument and a client component is provided. The method includes, but is not limited to, communicating a first software message in a first message format from a client component to a first connectivity driver, translating the first software message from the first message format to the second message format using the first connectivity driver, and communicating the software messages in the second message format directly to the first remote analytical instrument from the first connectivity driver. The first software message relates to the operation of a first remote analytical instrument. The first software message is selected from a standardized command set. The first remote analytical instrument is configured to receive messages in a second message format different than the first message format which are capable of inducing operation of the first remote analytical instrument. The connectivity driver uses the logical location of the first remote analytical instrument in order to communicate the hardware messages in the second message format to the first remote analytical instrument.

The scope of the present invention is defined solely by the appended claims and is not affected by the statements within this summary.

BRIEF DESCRIPTION OF THE DRAWINGS

The invention can be better understood with reference to the following drawings and description. The components in the figures are not necessarily to scale, emphasis instead being placed upon illustrating the principles of the invention.

FIG. 1 depicts a block schematic diagram of an exemplary computing system, in accordance with one embodiment of the present invention.

FIGS. 2A-2C depict a flow of information between a connectivity driver and a hardware device, in accordance with one embodiment of the present invention.

FIG. 3 depicts a block schematic diagram of computer program in communication with a hardware device, in accordance with one embodiment of the present invention.

FIG. 4 depicts a block schematic diagram of a client computer in communication with a remote computer and a plurality of analytical instruments, in accordance with one embodiment of the present invention.

DETAILED DESCRIPTION

Figure 2A:
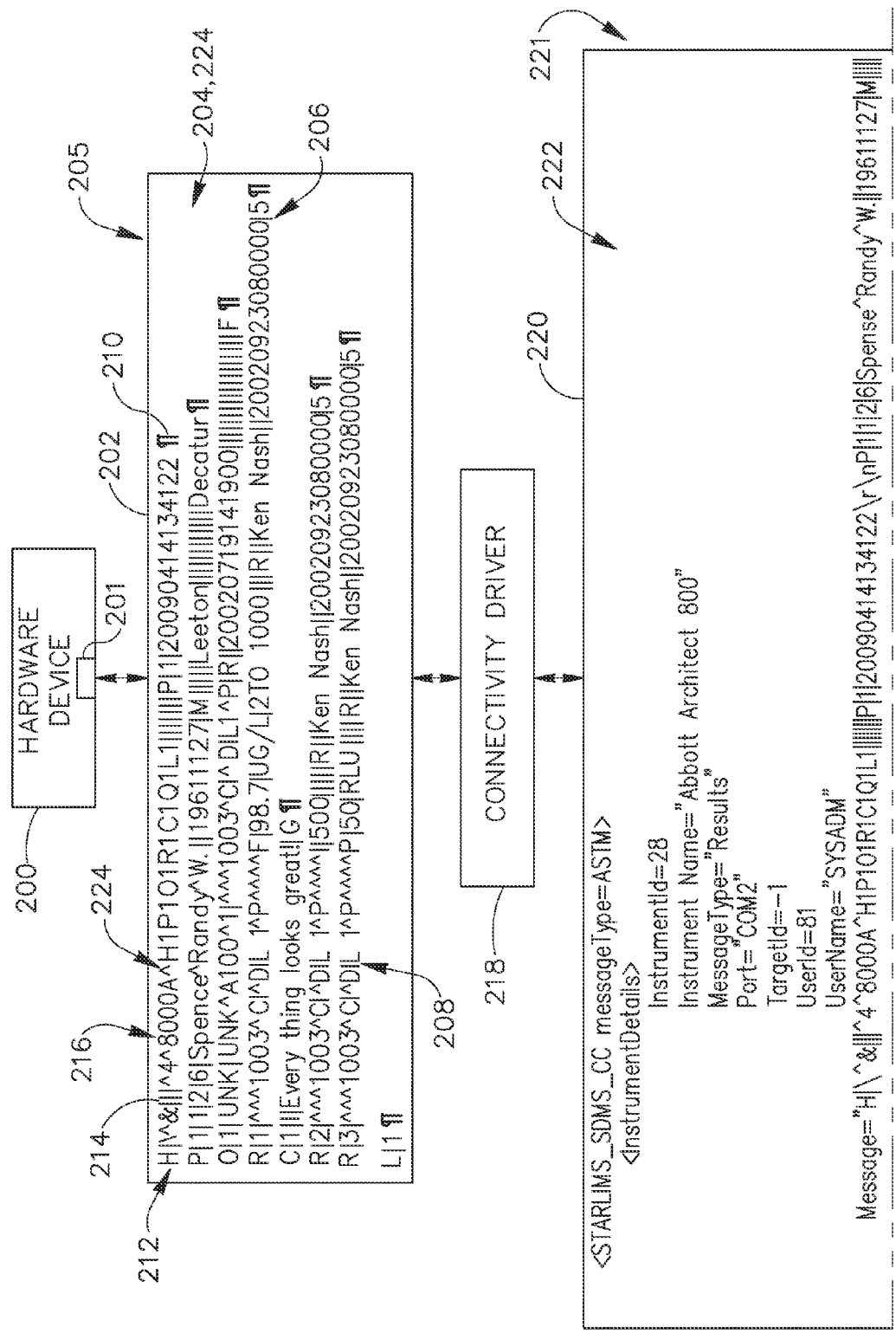
Figure 2C:
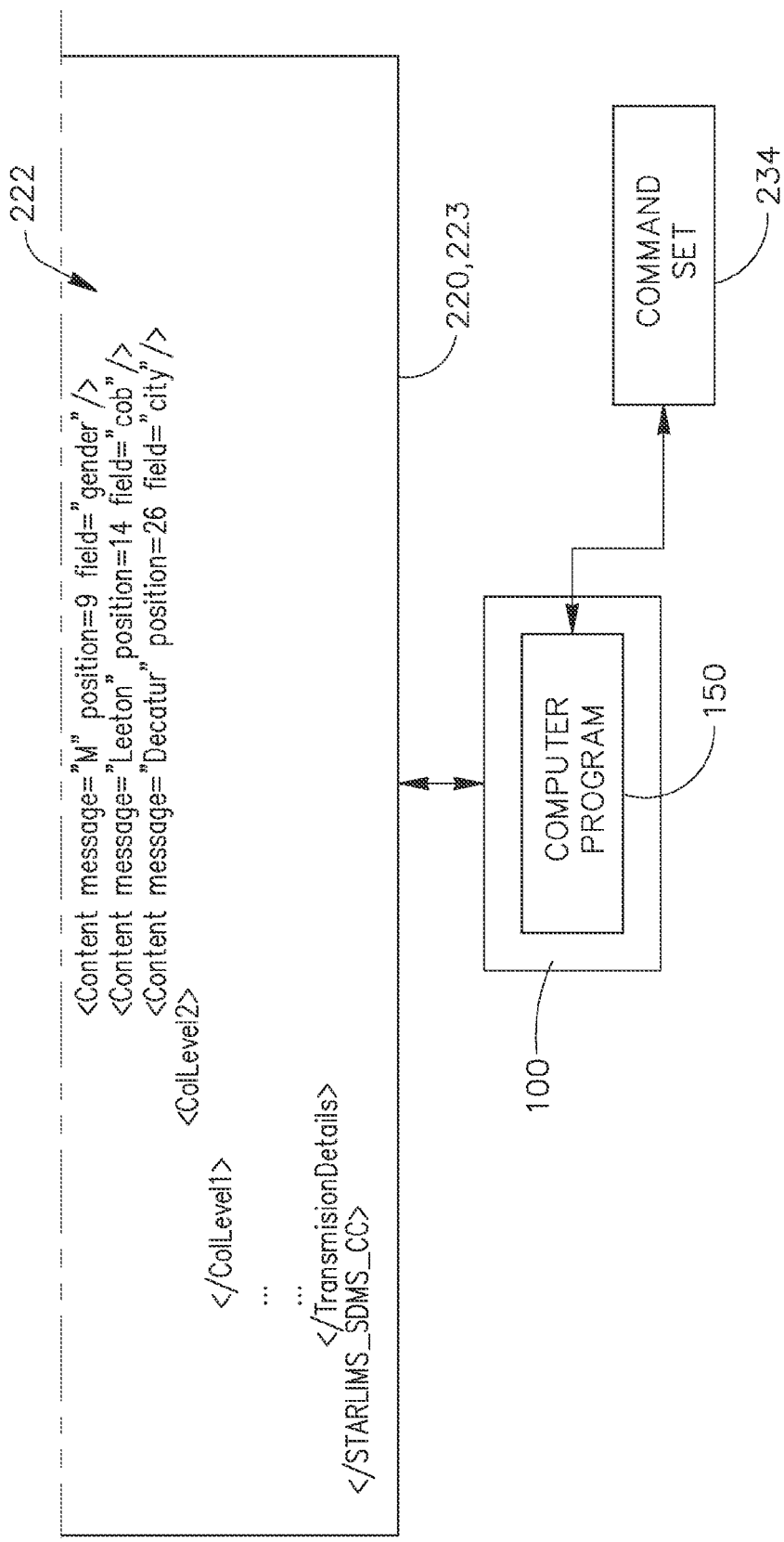

The present invention makes use of the discovery that by providing a user with LIMS software having a client component configured to communicate instructions in a first message format relating to the operation of a first remote analytical instrument, wherein the instructions are selected from a standardized command set, and wherein the LIMS software uses connectivity drivers, or connectivity drivers, to translate the instructions in the first message format into commands in the second message format, the LIMS is able to communicate between a plurality of remote analytical instruments without the use of a specialized hardware interface cards or specific software which needs to be written for and loaded onto each analytical instrument.

In the description that follows, the subject matter of the application will be described with reference to acts and symbolic representations of operations that are performed by one or more computers, unless indicated otherwise. As such, it will be understood that such acts and operations, which are at times referred to as being computer-executed, include the manipulation by the processing unit of the computer of electrical signals representing data in a structured form. This manipulation transforms the data or maintains it at locations in the memory system of the computer which reconfigures or otherwise alters the operation of the computer in a manner well understood by those skilled in the art. The data structures where data is maintained are physical locations of the memory that have particular properties defined by the format of the data. However, although the subject matter of the application is being described in the foregoing context, it is not meant to be limiting as those skilled in the art will appreciate that some of the acts and operations described hereinafter can also be implemented in hardware, software, and/or firmware and/or some combination thereof.

With reference to FIG. 1, depicted is an exemplary computing system for implementing embodiments. FIG. 1 includes computer 100 running a computer program 150, such as a LIMS software application 400 and a laboratory information system (LIS) software application 401, a management component 402, or a client component 403. Preferably, the LIS software application 401, the management component 402, and/or the client component 403 may be part of the LIMS software application 400 or may be separate and apart from but capable of communicating with each other and the LIMS software application 400. The LIMS software 400 is a software system used in laboratories for the integration of laboratory software and instruments and the management of samples, laboratory users, standards and other laboratory functions such as Quality Assurance (QA) and Quality Control (QC), sample planning, invoicing, plate management, and workflow automation. The LIS software application 401 is a class of software that receives, processes, and stores information generated by medical laboratory processes. The LIS software application 401 often must interface with instruments and other information systems such as hospital information systems (HIS). The LIS software application 401 is a highly configurable application which is customized to facilitate a wide variety of laboratory workflow models. The management component 402 is a piece of software that operates between and connects a computer program, such as a LIMS software application 400 or a LIS software application 401, with a hardware device 200. The management component 402, also known as a middleware software component, may be a part of or separate from the LIMS software application 400 or the LIS software application 401. The management component 402 provides for interoperability in support of a distributed architecture, comprising a LIMS software application 400 along with a variety of architectures and software components found in each hardware device 200.

The computer 100 includes a processor 110 in communication with a computer-readable medium 120. Computer-readable medium 120 is any medium which can be used to store information which can later be accessed by processor 110. Computer-readable medium 120 includes computer memory 125 and data storage devices 130. Computer memory 120 is preferably a fast-access memory and is used to run program instructions executable by the processor 110. Computer memory 120 includes random access memory (RAM), flash memory, and read only memory (ROM). Data storage devices 130 are preferably physical devices and are used to store any information or computer program which may be accessed by the processor 110, such as an operating system 140, computer programs 150 such as LIMS software application 400, program modules 160 such as a driver development module 410 which may run as a part of the middleware component 402, and program data 180. Data storage devices 130 and their associated computer-readable medium provide storage of computer-readable instructions, data structures, program modules and other data for the computer 100. Data storage devices 130 include magnetic medium like a floppy disk, a hard disk drive, and magnetic tape; an optical medium like a Compact Disc (CD), a Digital Video Disk (DVD), and a Blu-ray Disc; and solid state memory such as random access memory (RAM), flash memory, read only memory (ROM), and other non-transitory medium.

Computer 100 further includes input devices 190 through which data may enter the computer 100, either automatically or by a user who enters commands and data. Input devices 190 can include an electronic digitizer, a flatbed scanner, a barcode reader, a microphone, a camera, a video camera, a keyboard and a pointing device, commonly referred to as a mouse, a trackball or a touch pad, a pinpad, any USB device, any Bluetooth enabled device, an RFID or NFC device, and a debit card reader. Other input devices may include a joystick, game pad, satellite dish, scanner, an instrument, a sensor, and the like. In one or more embodiments, input devices 190 are portable devices that can direct display or instantiation of applications running on processor 110.

These and other input devices 190 can be connected to processor 110 through a user input interface that is coupled to a system bus 192, but may be connected by other interface and bus structures, such as a parallel port, game port or a universal serial bus (USB). Computers such as computer 100 may also include other peripheral output devices such as speakers, printers, and/or display devices, which may be connected through an output peripheral interface 194 and the like.

Computer 100 also includes a radio 198 or other type of communications device for wirelessly transmitting and receiving data for the computer 100 with the aid of an antenna. Radio 198 may wirelessly transmit and receive data using WiMAX™, 802.11a/b/g/n, Bluetooth™, 2G, 2.5G, 3G, and 4G, wireless standards.

Computer 100 may operate in a networked environment 195 using logical connections to one or more remote computers, such as a remote server 240. The remote server 240 may be a personal computer, a server, a router, a network PC, a peer device or other common network node, and may include many if not all of the elements described above relative to computer 100. Networking environments are commonplace in offices, enterprise-wide computer networks, intranets and the Internet. For example, in the subject matter of the present application, computer 100 may comprise the source machine from which data is being migrated, and the remote computer may comprise the destination machine. Note, however, that source and destination machines need not be connected by a network or any other means, but instead, data may be migrated via any media capable of being written by the source platform and read by the destination platform or platforms. When used in a LAN or WLAN networking environment, computer 100 is connected to the LAN or WLAN through a network interface 196 or an adapter. When used in a WAN networking environment, computer 100 may include a modem or other means for establishing communications over the WAN, such as radio 198, to environments such as the Internet or to another remote computer. It will be appreciated that other means of establishing a communications link between computer 100 and other remote computers may be used.

In one embodiment, computer 100 is in communication with remote server 240, and the LIMS software application 400 is run on the remote server 240, receiving commands and information from the computer 100 being input by a user. Information from the LIMS software application 400 running on the remote server 240 is displayed on a display connected with the computer 100.

With reference to FIGS. 2A, 2B, 2C, 3 and 4, a system 300 for communicating between a hardware device 200 and a computer program 150 is provided. The hardware device 200 is any piece of electronic hardware having a communications interface 201, such as a radio 198, a network interface 196, or an output peripheral interface 194 which can communicate with an interface of another piece of electronic hardware, such as computer 100, having a communications interface such as network interface 196 or radio 198. Preferably, hardware device 200 is any instrument, computer, or piece of electronic hardware found in a laboratory which can transmit and output the information 202 to another instrument, computer 100, or piece of electronic hardware. In one embodiment, hardware device 200 is an analytical instrument for use in a clinical laboratory, such as a biological analyzer which many be used to analyze mammalian biological samples, a chemical analyzer used to determine a sample's chemical composition, a hematology instrument, any type of chemical analyzer, flow cytometer, other LIS systems, other HIS systems, and other middleware solutions.

Preferably, each hardware device 200 has its own logical location 207 along with specific operating parameters and protocols under which the hardware device 200 communicates, either internally with itself or externally with other devices and computers. Operating parameters includes a hardware protocol 204 in a second message format 224 which is recognized by the hardware device 200 and used by the hardware device 200 to communicate both internally with itself and externally with other devices. The logical location 207 of the hardware device 200 is an address at which an item such as a hardware device 200, a memory cell, a storage element, and/or a network host, appears to reside from the perspective of an executing computer program, such as the LIMS software application 400.

The computer program 150 may be any computer program used in a laboratory setting and is preferably, a LIMS software application 400, preferably comprising, a LIS software application 401, a middleware component 402, and/or a client component 403. In one embodiment, the computer program 150 is a LIMS software application 400 having a client component 403 communicating with a middleware component 402. The computer 100 is any computer which can run computer program 150. Preferably, the computer 100 may include more than one computer. In one embodiment, computer 100 includes a client computer 310 in communication with a remote computer 320. Preferably, the client component 403 resides on the client computer 310, and the middleware component 402 resides on the remote computer 320, which is separate from and remote from the client computer 310 and in communication with the client computer 310. The client computer 310 is directly accessed by laboratory personnel and provides a way for laboratory personnel to interact with and access the LIMS software application 400. The remote computer 320 is separate and apart from the client computer 310, and preferably located a distance away from the client computer 310, such as in a separate room, a separate laboratory, or a separate building from the client computer 310. Preferably, at least a portion of the LIMS software application 400 operates on the remote computer 320, such as the management component 402.

In operation, the hardware device 200 may: 1) generate a hardware message 205 and communicate the hardware message 205 to the computer program 150; or 2) the hardware device 200 may receive any messages which are compatible with or in the second message format 224. Hardware message 205 includes any information 202 or hardware commands 203 which are provided by or generated by the hardware device 200 and which are communicated with the computer program 150. Information 202 is any data which can be generated or provided by the hardware device 200, and may include operational parameters for the hardware device 200 and data generated by the hardware device 200, such as test results, images, and such. Hardware command 203 are any instruction or instructions which may induce operation of the hardware device 200 to perform some action, such as to conduct a specific test or analysis.

The hardware device 200 is programmed to generate and receive messages which are compatible with or in the second message format 224. The hardware device 200 is capable of receiving any messages which are compatible with or in the second message format 224 from any external source, such as any computer 100 which is separate and apart from the hardware device 200, such as the client computer 310 or the remote computer 320, or any computer program 150 which is separate and apart from the hardware device 200, such as the LIMS software application 400. Preferably, the hardware device 200 receives messages via communications interface 201. Since any message received by the hardware device 200 must be in the second message format 224, if a message is generated in a format other than the second message format 224, such as the first message format 222, that message must be first be translated into the second message format 224 and then be transmitted to the hardware device 200 in the second message format 224.

In addition to receiving messages, the hardware device 200 is also capable of generating and communicating, via communications interface 201, hardware messages 205 to the computer program 150, and specifically the middleware component 402. Hardware messages 205 are generated by the hardware device 200 in the second message format 224. The second message format 224 is a particular way that information 202 or hardware commands 203 are encoded by or for the hardware device 200 so that they may be understood and decoded by the hardware device 200. Preferably, the second message format 224 is compatible with the hardware device 200, but generally not compatible with the first message format 222 used by the computer program 150. The second message format 224 is the message format of the hardware protocol 204 which is compatible with the hardware device 200.

Hardware messages 205 generated by the hardware device 200 are encoded using hardware protocol 204 used to encode discrete fields 208 of data using delimiters 206 for demarking the boundary of a discrete field 208 within the information 202 or hardware command 203 having a specific message format, preferably the second message format 224. Protocol 204 can be any standard or non-standard format used to encode information by a hardware device, such as HL7, ASTM, File buffers, or other custom protocols defined by a manufacturer of a hardware device 200. Delimiters 206 can be any type of textual character, symbols, binary structures, position information, or mark and includes such characters as: "~", "|", "\", "[", "]", "^", and a paragraph mark, for example. Instead of relying on a specific character or symbol, a position information delimiter relies on a specific position within the information 202 to delimit the information 202. Additionally, a mark delimiter relies on a demarcation within the information 202, such as an end-of-line indicator or section break, to delimit the information 202.

In one embodiment, the hardware messages 205 include record delimiters 210, field delimiters 214, and bracket delimiters 224. Field delimiters 214 separate discrete data fields 216 and record delimiters 210 separate groups of discrete data fields 216 known as a discrete record field 212. For example, a comma-separated values (CSV) message format uses a comma as a field delimiter 214 between discrete data fields 216, and an end-of-line indicator, or paragraph mark, as a record delimiter 210 between discrete record fields 212. Bracket delimiters 224, also known as block delimiters, region delimiters or balanced delimiters, mark both the start and end of a discrete region of text 226 within discrete data fields 216. For example, discrete data fields 216 may include information such as a Patient's Name, wherein the first, last and middle names of the patient may be separated using a bracket delimiter 224.

In addition to hardware messages 205 generated by the hardware device 200, software messages 221, which include instructions 223 or data 220, are generated by the computer program 150, and specifically the client component 403, in response to a request by a user, such as a laboratory technician, to perform a command or to transmit or receive data to or from the hardware device 200. Data 220 may be a request for information from the hardware device 200, such as a request for information 202 generated by the hardware device 200, or data 220 may be pushing data or information generated by the computer program 150 to the hardware device 200.

Instructions 223 are commands which are sent to the hardware device 200 for inducing operation of the hardware device 200 in some manner. Preferably, the instructions 223 are selected by computer program 150 from a standardized command set 234. The standardized command set 234 is a set of commands for a hardware device 200 which are not specific to a particular type of hardware device 200, but rather are generic commands which are applicable to a large number of types of hardware devices 200. A hardware device 200 of a particular or specific type is a hardware device from a particular manufacturer, family, and/or having a particular model number, such as the Architect Family of Analyzers manufactured by Abbott Laboratories. The standardized command set 234 may contain commands or instructions to perform a specific test, or to see the status of a specific test. Additional information such as a patients name or other identifier and the particular type of hardware device 200 to perform the test on may also be included in the instructions 223. Preferably, the standardized command set 234 is either part of or accessible by the computer program 150, and specifically, the client component 403. Preferably, the computer program 150 does not rely on additional information outside of the standardized command set 234 in order to generate instructions 223.

Software messages 221 are generated by the computer program 150 in a first message format 222. The first message format 222 is a particular way that software data 220 or software instructions 223 are encoded by the computer program 150 so that they may be understood and decoded by the computer program 150. Preferably, the first message format 222 is compatible with the computer program 150, such as the LIMS software application 400, but generally not compatible with the second message format 224. Preferably, the first message format 222 is different from and not compatible with the second message format 224. Preferably, the first message format 222 may be any message format which is readable by computer program 150, such as XML, and preferably, the second message format 224 is the message format of the hardware protocol 204.

The hardware device 200 is not configured to decode and understand software messages 221 when they are in the first message format 222, since the first message format 222 is not compatible with the hardware protocol 204 and the hardware device 200. Additionally, the computer program 150, and specifically, the client component 403, is not configured to decode and understand hardware messages 205 when they are in the second message format 224, since the second message format 224 is not compatible with the computer program 150, and specifically the client component 403.

As a result, in order for the hardware device 200 to communicate with the computer program 150, and for the computer program 150 to communicate with the hardware device 200, the computer program 150 includes a management component 402 which helps translate between the first message format 222 and the second message format 224. The management component 402 communicates software messages 221 generated by the computer program 150 with the hardware device 200, and communicates hardware messages 205 generated by the hardware device 200 with the computer program 150 using a connectivity driver 218.

Connectivity driver 218 is specific to both the computer program 150 and the hardware device 200 and is familiar with the first message format 222 and the second message format 224. Preferably, the connectivity driver 218 is specific to one type of hardware device 200, for example, specific to a certain manufacturer and/or model of analytical instrument. Preferably, the connectivity driver 218 is centrally located on remote computer 320 in communication with both client computer 310 which operates client component 403 and hardware device 200, such as remote analytical instrument 302, 304, or 306, as shown in FIG. 4.

The connectivity driver 218 is a computer program, or a portion of a computer program, that allows a higher-level computer program, such as the LIMS software application 400, to interact with the hardware device 200. The connectivity driver 218 typically communicates with the hardware device 200 through a system bus 192 of a computer 100 or a communications device connected with the computer 100, such as a radio 198 or a network interface 196 to which the hardware device 200 connects via the communications interface 201 of the hardware device 200. The connectivity driver 218 is a serialized object, containing the necessary logic for communication with an external device, such as hardware device 200. The connectivity driver 218 contains four layers: 1) message logical structure definition, which is a definition of the logical structure of a message or messages that the connectivity driver 218 is capable of handling; 2) message into frames packing and decoration logic; 3) physical communication protocol logic; and 4) a custom scripting interface, extending to the 3 layers above.

When the computer program 150 generates and communicates software messages 221 with the hardware device 200, the software messages 221 are routed to the connectivity driver 218, and the connectivity driver 218 translates the software messages 221 from the first message format 222 to the second message format 224. Software data 220 and software instructions 223 are translated into hardware information 202 or hardware commands 203. Once in the second message format 224, the software messages 221 are then able to be communicated to and decoded by the hardware device 200.

When the hardware device 150 generates and communicates hardware messages 205 with the computer program 150, the hardware messages 205 are routed to the connectivity driver 218, and the connectivity driver 218 translates the hardware messages 205 from the second message format 224 to the first message format 222. Hardware information 202 or hardware commands 203 are translated into software data 220 and software instructions 223. Once in the first message format 222, the hardware messages 205 are then able to be communicated to and decoded by the computer program 150.

Connectivity drivers 218 are specific to a particular type of hardware device 200 and specific to a particular computer program 150, such as the LIMS software application 400 and are designed to translate information between two message formats. Connectivity drivers 218 also usually provide interrupt handling required for any necessary asynchronous time-dependent interface between the hardware device 200 and the computer program 150.

When developing the connectivity driver 218 for the computer program 150, a user typically has to write program code for the computer program 150 from which the connectivity driver 218 is executed for each hardware device 200 for which the computer program 150 wishes to communicate and interact with. The task of writing program code for a connectivity driver 218 is often laborious and requires many hours of work from a trained computer programmer to complete. Writing program code for a connectivity driver 218 also requires an in-depth understanding of how the hardware device 200 and the computer program 150 function. Typically, the user of a computer program 150 such as a LIMS software application 400 does not have the type of training and skills needed to write the program code needed from which the connectivity driver 218 is executed. As a result, in one embodiment, the connectivity driver 218 may be converted into program code from a graphical diagram using a graphical program, as described in U.S. patent application Ser. No. 12/983,167 entitled "GRAPHICALLY BASED METHOD FOR DEVELOPING CONNECTIVITY DRIVERS" and filed on Dec. 31, 2010 with the United States Patent and Trademark Office, the contents of which are hereby incorporated by reference in their entirety to the extent permitted by law.

Preferably, the connectivity driver 218 is a component of or a module of the management component 402. Preferably, the connectivity driver 218 and the management component 402 are located on a centralized computer server, such as, remote computer 320, which is in communication with the computer program 150 and the hardware device 200. The connectivity driver 218 is a software-based solution to translation between the first message format 222 and the second message format 224, allowing for communication between the computer program m150 and the hardware device 200. By using a software-based connectivity driver 218, the computer program 150 is able to communicate between a plurality of remote hardware devices 200, such as analytical instruments 302, 304, 306, without the use of a specialized hardware interface cards or specific software which needs to be written for and loaded onto each analytical instrument 302, 304, 306.

Figure 5:
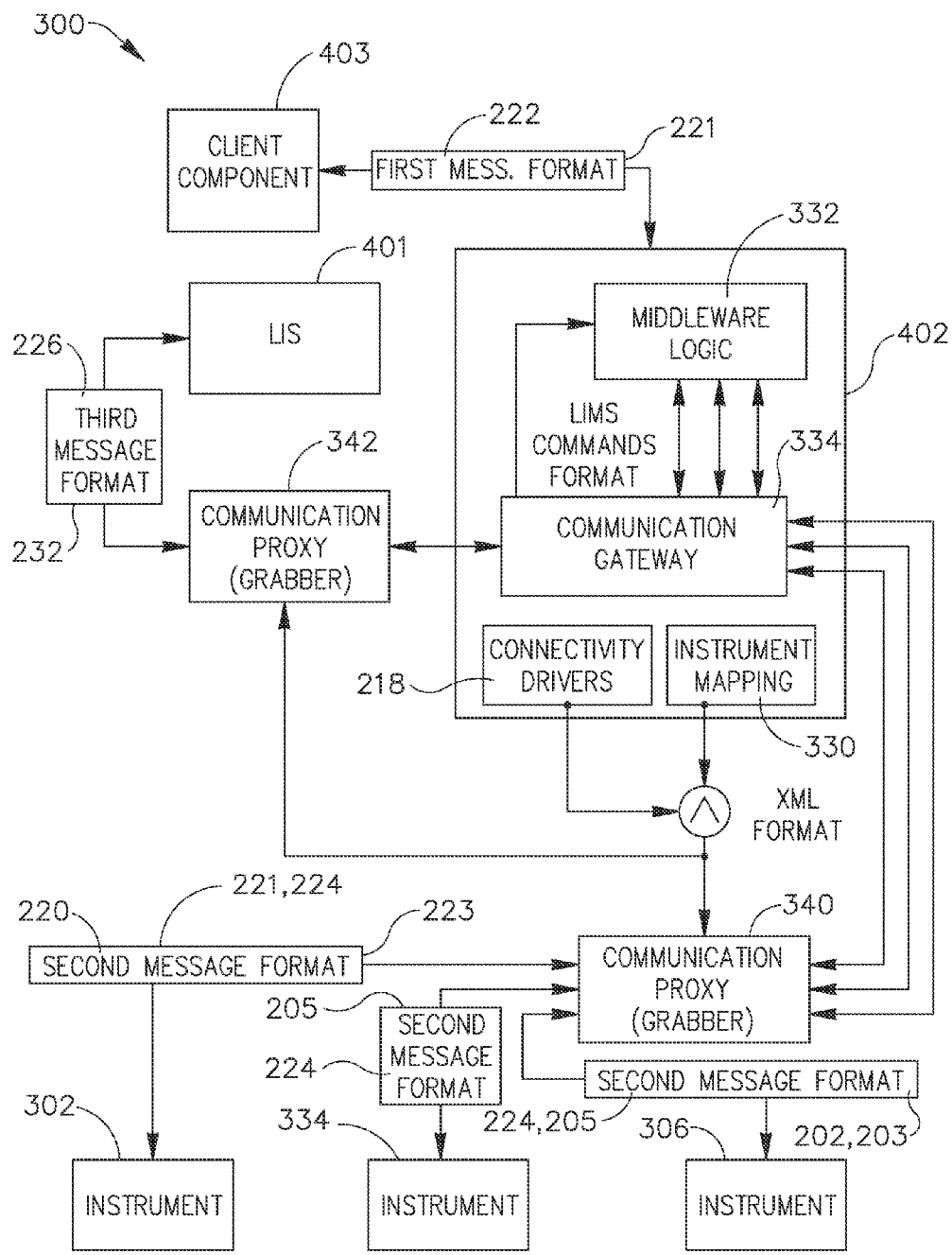
FIG. 5 depicts a block schematic diagram of a client component, an LIS, and a plurality of hardware devices in communication with a management component, in accordance with one embodiment of the present invention.

Preferably, the connectivity driver 218 has access to the logical location 207 of the hardware device 200 so that hardware messages 205 in the second message format 224 can be directly communicated by the connectivity driver 218 with the hardware device 200, and vice versa. In one embodiment, the logical location 207 of the hardware device 200 is programmed in advance into the connectivity driver 218. In one embodiment, the logical location 207 is located in an instrument mapping database 330 and made accessible to the connectivity driver 218, as shown in FIG. 5.

Preferably, in order for computer program 150 to communicate with hardware device 200, connectivity driver 218 is loaded into or connected with computer program 150. The connectivity driver 218 is specifically programmed to be capable of translating between the first and second message formats 222, 224, by recognizing, for example certain delimiters or information in each message format, and parsing such information out. In one embodiment, a single connectivity driver 218 may be able to communicate with a plurality of hardware devices 200. In one embodiment, each hardware device 200 requires its own connectivity driver 218 in order to communicate with the computer program 150.

Preferably, all the connectivity drivers 218 are all located in the middleware component 402, and as a result, allow for centralized management of the communications and translation of information between the client component 403 and the hardware devices 200. This centralized management simplifies the architecture of a LIMS 400 and system 300.

When connectivity driver 218 receives hardware messages 205, the connectivity driver 218 uses a parsing sequence for analyzing and converting the hardware messages 205 sent using the hardware protocol 204 from the second message format 224 to the first message format 222 which can be decoded by computer program 150. The entire parsing sequence defines a hardware grammar used to encode and decode discrete fields 208 into and from the hardware messages 205. When connectivity driver 218 receives software messages 221, the connectivity driver 218 also uses the parsing sequence for analyzing and converting the software messages 221 generated at the client component 403 from the first message format 222 to the second message format 224 which can be decoded by hardware device 200. The connectivity driver 218 serves to essentially translate hardware messages 205 in the second message format 224 into software messages 221 in the first message format 222 and software messages 221 of the first message format 222 into hardware messages 205 in the second message format 224, so that the hardware device 200 can communicate with the computer program 150, and specifically the client component 403, and so that the computer program 150 can communicate with the hardware device 200.

In one embodiment, the management component 402 has multiple connectivity drivers 218, each used to communicate with a different hardware device 200. For example, second software messages 221 in a first message format 222 may be communicated from the client component 403 with a second connectivity driver 218. The second software messages 221 in the first message format 222 may relate to the operation of a second remote analytical instrument 304 configured to receive hardware messages 205 in a third format different than the first message format 222.

In one embodiment, a single connectivity driver 218 is capable of communicating with a plurality of hardware devices 200 of the same type. Hardware devices 200 of the same type are hardware device 200 which share a particular manufacturer, family, and/or share a particular model number, such as the Architect Family of Analyzers manufactured by Abbott Laboratories of Abbott Park, Ill. In this embodiment, a single connectivity driver 218 is configured to send and receive hardware messages 205 to and from all hardware devices 200 of the same type in a location, such as all biological analyzers in the Architect Family which are in a laboratory.

With reference to FIG. 5, in one embodiment, the middleware component 402 includes middleware logic 332 in communication with a communication gateway 334 in addition to the connectivity drivers 218 and the instrument mapping database 330. The middleware logic 332 controls how the middleware component 402 operates, whether and how tests on samples are run, and what hardware device 200 may perform the test on the sample.

In one embodiment, the system 300 includes the LIS 401 which generates LIS messages 232 in a third message format 226 which are communicated with the hardware device 200. When the LIS 401 generates and communicates LIS messages 232 with the hardware device 200, the LIS messages 232 are routed to a connectivity driver 218, and the connectivity driver 218 translates the LIS messages 232 from the third message format 226 to the second message format 224.

In one embodiment, the system 300 includes a communications proxy or grabber 340 which routes messages 205, 221, and 232 between the hardware device 200 and the middleware component 402, and specifically the communications gateway 334. In one embodiment, the system 300 includes a second communications proxy or grabber 342 which routes messages 205, 221, and 232 between the LIS 401 and the middleware component 402, and specifically the communications gateway 334.

In one embodiment, one or more connectivity drivers 218 are able to broadcast a translated message 221, 232 to a plurality of hardware devices 200, to a specific selection of hardware devices 200 such as all hardware devices 200 of a particular type, or to all of the hardware devices 200. In this embodiment, the broadcasted message 221, 232 may include a specific hardware command 203 to be performed. Preferably, the first hardware device 200 which performs the specific hardware command 203 send a hardware message 205 signaling that the specific hardware command 203 has been performed. In this case, the middleware logic 232 then generates a message which transmitted to the connectivity driver 218 for translation into the second message format 224, and which is then broadcast back to the remaining hardware devices 200 instructing them to not perform the specific hardware command 203, since the specific hardware command 203 has already been performed.

In one embodiment the hardware device 200 includes a dedicated computer connected with an instrument. In this embodiment, the hardware messages 205 in the second message format 224 can be directly communicated by the connectivity driver 218 to the dedicate computer of the hardware device 200.

In one embodiment, system 300 may include a plurality of hardware devices 200, such as a first remote analytical instrument 302, a second remote analytical instrument 304, and a third remote analytical instrument 306 all in communication with remote computer 320, as illustrated in FIG. 4. Remote computer 320 contains connectivity drivers 218 to communicate with each remote analytical instrument 302, 304, 306. In this manner a simplified and centralized architecture may be used to communicate between a LIMS software application 400 and a plurality of remote analytical instruments 302, 304, 306.

Figure 6:
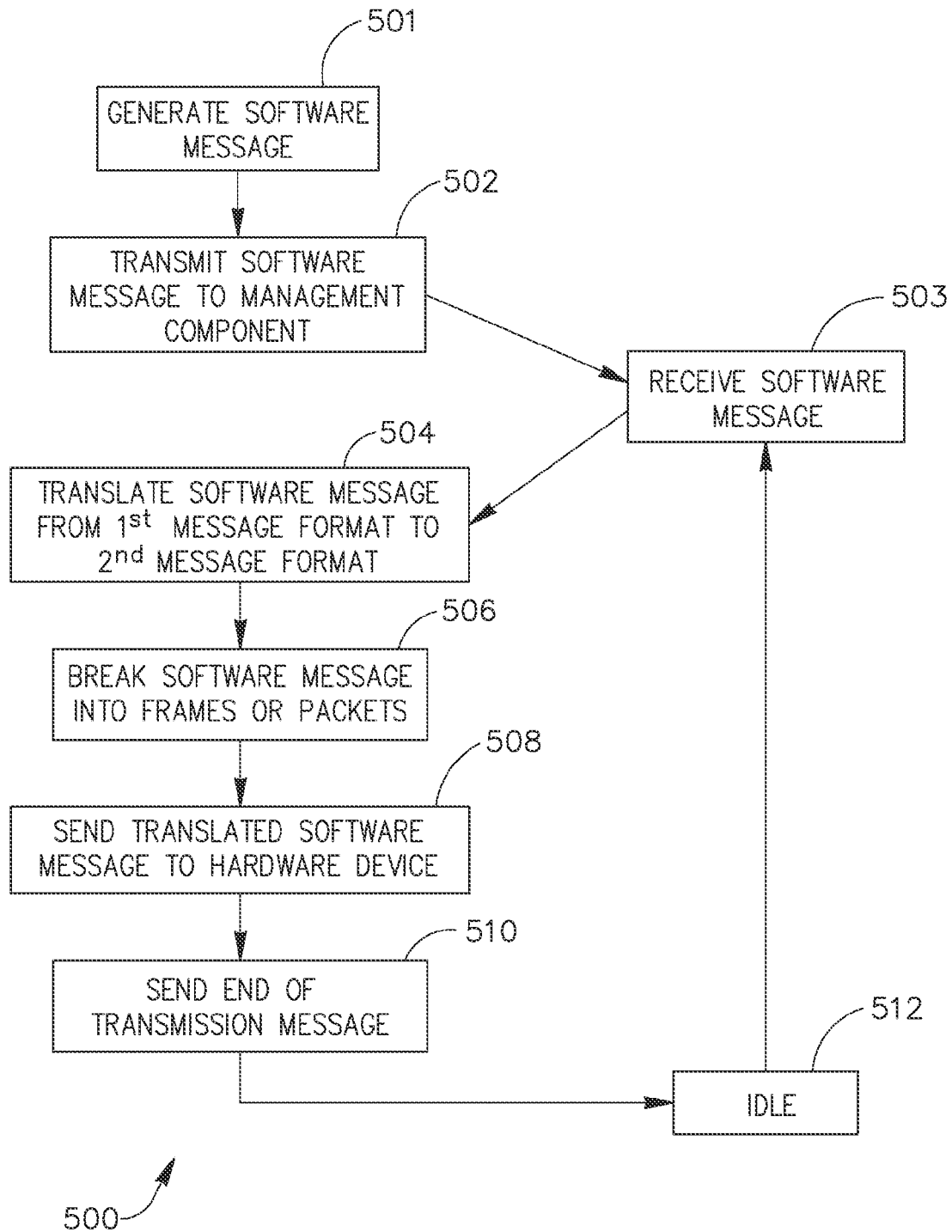
FIGS. 6 and 7 depict flowchart illustrations of methods, apparatus (systems) and computer program products, in accordance with one embodiment of the present invention.

With reference to FIG. 6, is a flowchart representation of a method 500 for generating and sending software messages 221 from the computer program 150 to the hardware device 200. Method 500 is initiated at block 501 by using the computer program 150, such as the LIMS software application 400, to generate a software message 221 to be communicated with the hardware device 200. The software message 221 may be generated upon receiving a command from a user of the computer program to send a message to the hardware device 200. Preferably, the software message 221 contains an instruction 223 to the hardware device 200. The software message 221 is preferably generated by the LIMS software application 400, and preferably the client component 403 of the LIMS software application 400. The instruction 223 may be an order command, which is a request for the hardware device 200 to perform a test on a certain sample. A sample includes may include a sampling of chemicals, materials, or biological materials which needs to be tested. In addition to the instruction 223, the software message 221 may contain information about the sample, such as a patient name, information about the order such as an order id, and information about the specific test to be performed such as test codes.

Moving to block 502, the software message 221 is transmitted to the management component 402, which may be a separate component from or may be part of the LIMS software application 400. At block 503, the management component 402 receives the software message 221 and, at block 504, the management component 402 then uses connectivity driver 218 to translate the software message 221 from the first message format 222 to the second message format 224, such as a formatted ASTM message, using message translation definitions located in the connectivity driver 218.

Moving to block 506, the management component 402 may then break the translated software message 221 into frames or packets, using packet decoration logic located in the connectivity driver 218. The management component 402 then sends a begin transmission command to the hardware device 200, according to physical communication definitions located in the connectivity driver 218. The management component 402 then waits for the hardware device 200 to issue and transmit a "ready" response, according to physical communication definitions located in the connectivity driver 218.

Upon receiving a "ready" response from the hardware device 200, at block 508, the management component 402, and specifically the connectivity driver 218, sends the translation software message 221 to the hardware device 200, preferably packet by packet, while receiving acknowledgments from the hardware device 200 for receipt of each packet, according to physical communication definitions located in the connectivity driver 218.

Upon transmitting the entire software message 221, the management component 402 then sends an "end of transmission" signal to the hardware device 200, and goes into "Idle" state at block 512, according to physical communication definitions in the connectivity driver 218, until another software message 221 is received at block 503.

Figure 7:
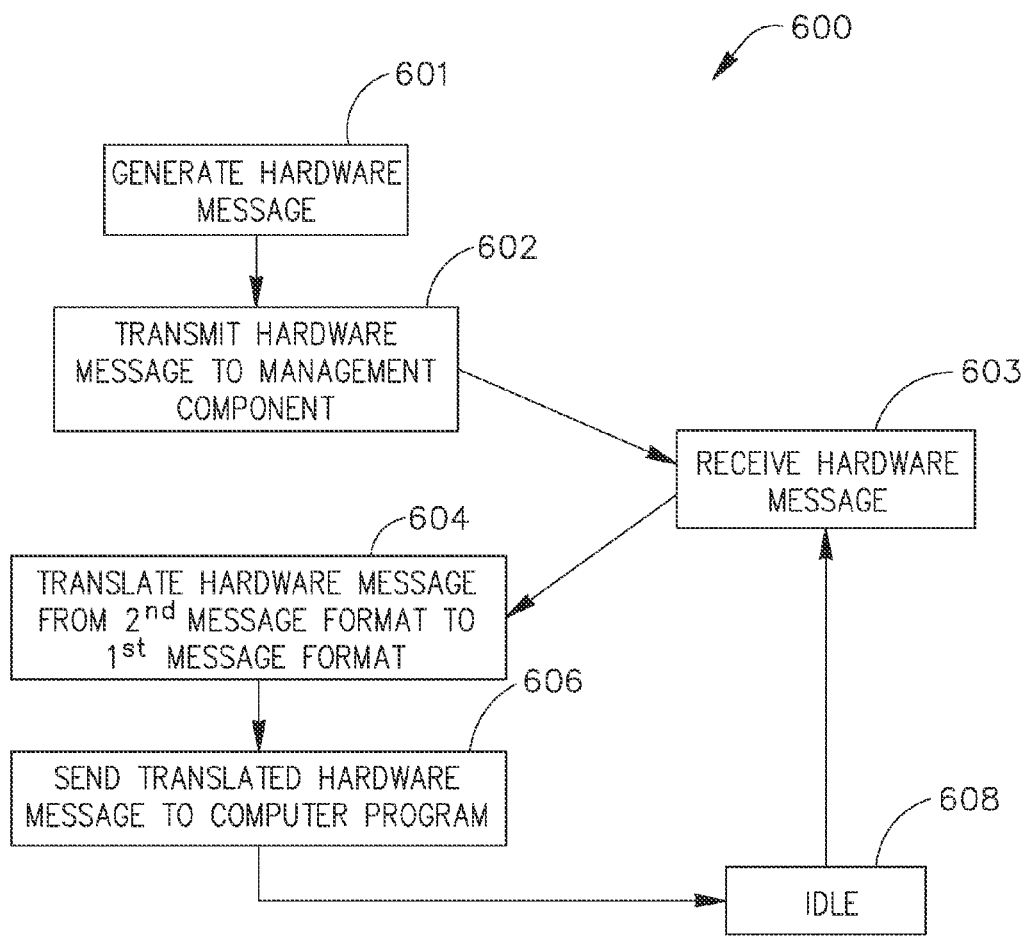

With reference to FIG. 7, is a flowchart representation of a method 600 for generating and send hardware messages 205 from the hardware device 200 to the computer program 150. Method 600 is initiated at block 601 by using the hardware device 200 to generate a hardware message 205 to be communicated with the computer program 150. At block 601, the hardware device 200 generates a hardware message 205, and then at block 602, the hardware device 200 transmits the hardware message 205 to the computer program 150, and specifically the management component 402 of the LIMS software application 400. The management component 402 initially receives a "begin transmission" signal from the hardware device 200, indicating that transmission of a hardware message 205 is about to commence. The management component 402 then responds by transmitting a "ready" signal according to physical communication definitions in the connectivity driver 218.

Upon transmitting the "ready" signal, the management component 402 then receives the hardware message 402, at block 603, which is preferably broken up into data packets, from the hardware device 200. Upon reception of each data packet, the management component 402 acknowledges the reception of each data packet, according to physical communication definitions in the connectivity driver 218.

Once the entire hardware message 205 has been transmitted, the management component 402 receives an "end of transmission" signal indicating that the entire hardware message 205 has been transmitted. The management component 402 then reconstructs the hardware message 205 from the received data packets, using the packet decoration logic in the connectivity driver 218.

At block 604, the management component 402 then translates the hardware message 205 from a second message format 224, such as ASTM, into a first message format 222, such a LIMS command understood by the LIMS software application 400. The management component 402 translates the hardware message 205 using the message translation definitions in the connectivity driver 218, and then sends the translated hardware message 205 to the computer program 150, or to other portions of the computer program 150, such as client component 403, at block 606. Upon transmitting the entire hardware message 205, the management component 402 then goes into an "Idle" state at block 608, until another hardware message 205 is received at block 603.

Those having skill in the art will recognize that the state of the art has progressed to the point where there is little distinction left between hardware and software implementations of aspects of systems; the use of hardware or software is generally (but not always, in that in certain contexts the choice between hardware and software can become significant) a design choice representing cost vs. efficiency tradeoffs. Those having skill in the art will appreciate that there are various vehicles by which processes and/or systems and/or other technologies described herein can be effected (e.g., hardware, software, and/or firmware), and that the preferred vehicle will vary with the context in which the processes and/or systems and/or other technologies are deployed. For example, if an implementer determines that speed and accuracy are paramount, the implementer may opt for a mainly hardware and/or firmware vehicle; alternatively, if flexibility is paramount, the implementer may opt for a mainly software implementation; or, yet again alternatively, the implementer may opt for some combination of hardware, software, and/or firmware. Hence, there are several possible vehicles by which the processes and/or devices and/or other technologies described herein may be effected, none of which is inherently superior to the other in that any vehicle to be utilized is a choice dependent upon the context in which the vehicle will be deployed and the specific concerns (e.g., speed, flexibility, or predictability) of the implementer, any of which may vary. Those skilled in the art will recognize that optical aspects of implementations will typically employ optically-oriented hardware, software, and or firmware.

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples can be implemented, individually and/or collectively, by a wide range of hardware, software, firmware, or virtually any combination thereof. In one embodiment, several portions of the subject matter described herein may be implemented via Application Specific Integrated Circuits (ASICs), Field Programmable Gate Arrays (FPGAs), digital signal processors (DSPs), or other integrated formats.

However, those skilled in the art will recognize that some aspects of the embodiments disclosed herein, in whole or in part, can be equivalently implemented in integrated circuits, as one or more computer programs running on one or more computers (e.g., as one or more programs running on one or more computer systems), as one or more programs running on one or more processors (e.g., as one or more programs running on one or more microprocessors), as firmware, or as virtually any combination thereof, and that designing the circuitry and/or writing the code for the software and or firmware would be well within the skill of one of skill in the art in light of this disclosure. In addition, those skilled in the art will appreciate that the mechanisms of the subject matter described herein are capable of being distributed as a program product in a variety of forms, and that an illustrative embodiment of the subject matter described herein applies regardless of the particular type of signal bearing medium used to actually carry out the distribution. Examples of a signal bearing medium include, but are not limited to, the following: a computer-readable medium such as a magnetic medium like a floppy disk, a hard disk drive, and magnetic tape; an optical medium like a Compact Disc (CD), a Digital Video Disk (DVD), and a Blu-ray Disc; computer memory like random access memory (RAM), flash memory, and read only memory (ROM); and a transmission type medium such as a digital and/or an analog communication medium like a fiber optic cable, a waveguide, a wired communications link, and a wireless communication link.

The herein described subject matter sometimes illustrates different components contained within, or connected with, different other components. It is to be understood that such depicted architectures are merely exemplary, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermediate components. Likewise, any two components so associated can also be viewed as being "operably connected", or "operably coupled", to each other to achieve the desired functionality, and any two components capable of being so associated can also be viewed as being "operably couplable", to each other to achieve the desired functionality. Specific examples of operably couplable include but are not limited to physically mateable and/or physically interacting components and/or wirelessly interactable and/or wirelessly interacting components and/or logically interacting and/or logically interactable components.

While particular aspects of the present subject matter described herein have been shown and described, it will be apparent to those skilled in the art that, based upon the teachings herein, changes and modifications may be made without departing from the subject matter described herein and its broader aspects and, therefore, the appended claims are to encompass within their scope all such changes and modifications as are within the true spirit and scope of the subject matter described herein. Furthermore, it is to be understood that the invention is defined by the appended claims. Accordingly, the invention is not to be restricted except in light of the appended claims and their equivalents.

The invention claimed is:

1. A computer-based system for communicating between a remote analytical instrument and a client component of a Laboratory Information Management System (LIMS) software application for the management of samples, the computer-based system comprising:
a first remote analytical instrument having a first logical location, the first remote analytical instrument having a processor in communication with a non-transitory computer-readable medium and used to analyze chemical or biological samples;
one or more processors coupled to memory in the computer-based system, the computer-based system executing:
a client component configured to communicate a first software message in a first message format relating to the operation of the first remote analytical instrument,
wherein the first software message contains information about a sample, including an order identifier and information about a specific test to be performed on the sample by the first remote analytical instrument,
wherein the first software message is selected from a standardized command set, wherein the standardized command set includes commands for the first remote analytical instrument which are not specific to the first remote analytical instrument but rather a re generic commands which are applicable to a plurality of remote analytical instruments, wherein the first remote analytical instrument receives messages in a second message format different than the first message format, wherein messages in the second message format are recognized by the first remote analytical instrument and induce operation of the first remote analytical instrument;

a management component configured to receive the first software message in a first message format from the client component;

an instrument mapping database provided in the management component, the instrument mapping database defining a plurality of logical locations corresponding to respective remote analytical instruments, and including the first logical location corresponding to the first remote analytical instrument;

wherein the management component communicates the first software message in the first message format with a first connectivity driver, wherein the first connectivity driver is a software component located on a centralized server which in communication with the client component and the first remote analytical instrument, wherein the first connectivity driver translates the first software messages from the first message format into the second message format, wherein the first connectivity driver is operatively coupled to the instrument mapping database and obtains the first logical location of the first remote analytical instrument from the instrument mapping database, such that software messages in the second message format can be directly communicated by the first connectivity driver to the first remote analytical instrument according to physical communication definitions located in the first connectivity driver, and wherein the first remote analytical instrument is incapable of recognizing messages in the first message format and lacks capability to translate a message from one format to another format.

2. The system of claim 1, wherein the management component communicates a second software message in a first message format from the client component, wherein the second software message relates to the operation of a second remote analytical instrument, wherein the second software message is selected from the standardized command set, wherein the second remote analytical instrument receives messages in a third message format different than the first message format, wherein the messages in the third message format are recognized by the second remote analytical instrument and induce operation of the second remote analytical instrument, and wherein the first connectivity driver is configured to translate the first software messages from the first message format into the third message format.

3. The system of claim 1, further comprising a second remote analytical instrument having a second logical location defined in the instrument mapping database, wherein the second remote analytical instrument receives messages in the second message format same as the first remote analytical instrument, wherein the messages in the second message format are recognized by the second remote analytical instrument and induce operation of the second remote analytical instrument, wherein the first connectivity driver translates the first software messages from the first message format to the second message format recognized by the second remote analytical instrument, and wherein the first connectivity driver communicates software messages in the second message format to the second remote analytical instrument so as to induce operation of the second remote analytical instrument.

4. The system of claim 1, wherein the first connectivity driver is converted into program code from a graphical diagram.

5. The system of claim 1, wherein the first connectivity driver communicates with other remote analytical instruments of a first type.

6. The system of claim 1, wherein the first remote analytical instrument includes a dedicated computer, and wherein the software messages in the second message format can be directly communicated by the first connectivity driver to the dedicated computer of the first remote analytical instrument.

7. The system of claim 1, wherein the first software message in the first message format does not contain the logical location of the first remote analytical instrument.

8. A computer-readable medium comprising program instructions for allowing communication between a remote analytical instrument and a client component, the remote analytical instrument used to analyze chemical or biological samples, wherein the computer-readable medium is a non-transitory medium, and wherein the program instructions are executable by a processor to:

communicate a first software message in a first message format from a client component using a first connectivity driver, wherein the first software message relates to the operation of a first remote analytical instrument and is selected from a standardized command set, wherein the first software message contains information about a sample, including an order identifier and information about a specific test to be performed on the sample by the first remote analytical instrument, wherein the first remote analytical instrument receives and decodes messages in a second message format different than the first message format, wherein the messages in the second message format induce operation of the first remote analytical instrument, and wherein the first remote analytical instrument has a processor in communication with a non-transitory computer-readable medium;

receive the first software message from the client component at the first connectivity driver;

translate the first software message from the first message format to the second message format using the first connectivity driver; and communicate the first software message in the second message format to the first remote analytical instrument, wherein the first connectivity driver receives the logical location of the first remote analytical instrument from an instrument mapping database that defines a plurality of logical locations corresponding to respective remote analytical instruments, and including the first logical location corresponding to the first remote analytical instrument, in order to communicate the first software message in the second message format to the first remote analytical instrument according to physical communication definitions located in the first connectivity driver, wherein the first remote analytical instrument is incapable of recognizing messages in the first message format and lacks capability to translate a message from one format to another format.

9. The computer-readable medium of claim 8, further comprising program instructions executable by a processor to:

communicate a second software message in a first message format from the client component, wherein the second software message relates to the operation of a second remote analytical instrument and is selected from the standardized command set, wherein the second remote analytical instrument receives messages in a third message format different than the first message format, wherein messages in the third message format are recognized by the second remote analytical instrument and induce operation of the second remote analytical instrument, and wherein the first connectivity driver translates the first software messages from the first message format into the third message format.

10. The computer-readable medium of claim 8, further comprising program instructions executable by a processor to:
communicate software messages in the second message format directly to a second remote analytical instrument from the first connectivity driver, wherein the first connectivity driver uses the logical location of the second remote analytical instrument in order to communicate the software message in the second message format to the second remote analytical instrument.

11. The computer-readable medium of claim 8, wherein the first connectivity driver is converted into program code from a graphical diagram.

12. The computer-readable medium of claim 8, wherein the first connectivity driver communicates with other remote analytical instruments of a first type.

13. The computer-readable medium of claim 8, wherein the first remote analytical instrument includes a first instrument component connected with the first remote analytical instrument, and wherein the first instrument component translates software messages in the second message format to messages in a format recognized by the first remote analytical instrument and induce operation of the first remote analytical instrument.

14. The computer-readable medium of claim 8, wherein the first software message in the first message format does not contain the logical location of the first remote analytical instrument.

15. A method for allowing communication between a remote analytical instrument and a client component, the remote analytical instrument used to analyze chemical or biological samples, comprising:
communicating a first software message in a first message format from a client component to a first connectivity driver, wherein the first software message relates to the operation of a first remote analytical, wherein the first remote analytical instrument has a processor in communication with a non-transitory computer-readable medium, wherein the first software message contains information about a sample, including an order identifier and information about a specific test to be performed on the sample by the first remote analytical instrument, wherein the first software message is selected from a standardized command set, wherein the first remote analytical instrument receives messages in a second message format different than the first message format which induce operation of the first remote analytical instrument;
translating the first software message from the first message format to the second message format using the first connectivity driver; and
communicating the software messages in the second message format directly to the first remote analytical instrument from the first connectivity driver according to physical communication definitions located in the first connectivity driver, wherein the first connectivity driver users the logical location of the first remote analytical instrument obtained from an instrument mapping database that defines a plurality of logical locations corresponding to respective remote analytical instruments, and including the first logical location corresponding to the first remote analytical instrument, in order to communicate software messages in the second format to the first remote analytical instrument, wherein the first remote analytical instrument is incapable of recognizing messages in the first message format and lacks capability to translate a message from one format to another format.

16. The method of claim 15, further comprising:
communicating a second software message in a first message format from the client component, wherein the second software message relates to the operation of a second remote analytical instrument and is selected from the standardized command set, wherein the second remote analytical instrument receives messages in a third format different than the first message format, wherein the messages in the third format are recognized by the second remote analytical instrument and induce operation of the second remote analytical instrument, and wherein the first connectivity driver translates the first software messages from the first message format into the third message format.

17. The method of claim 15, further comprising:
communicating the software message in the second message format directly to a second remote analytical instrument from the first connectivity driver, wherein the first connectivity driver uses the logical location of the second remote analytical instrument in order to communicate software messages in the second message format to the second remote analytical instrument.

18. The method of claim 15, wherein the first connectivity driver is converted into program code from a graphical diagram.

19. The method of claim 15, wherein the first connectivity driver communicates with other remote analytical instruments of a first type.

20. The method of claim 15, wherein the first remote analytical instrument includes a dedicated computer, and wherein the software message in the second message format can be directly communicated by the first connectivity driver to the dedicated computer of the first remote analytical instrument.

21. the system of claim 1, wherein the first software message contains an order command for the first remote analytical instrument to perform a test on the sample.

* * * * *